(No Model.)
F. G. TALLMAN.
DEVICE FOR BALANCING ROLLS OF ROLLING MILLS.
No. 367,464. Patented Aug. 2, 1887.
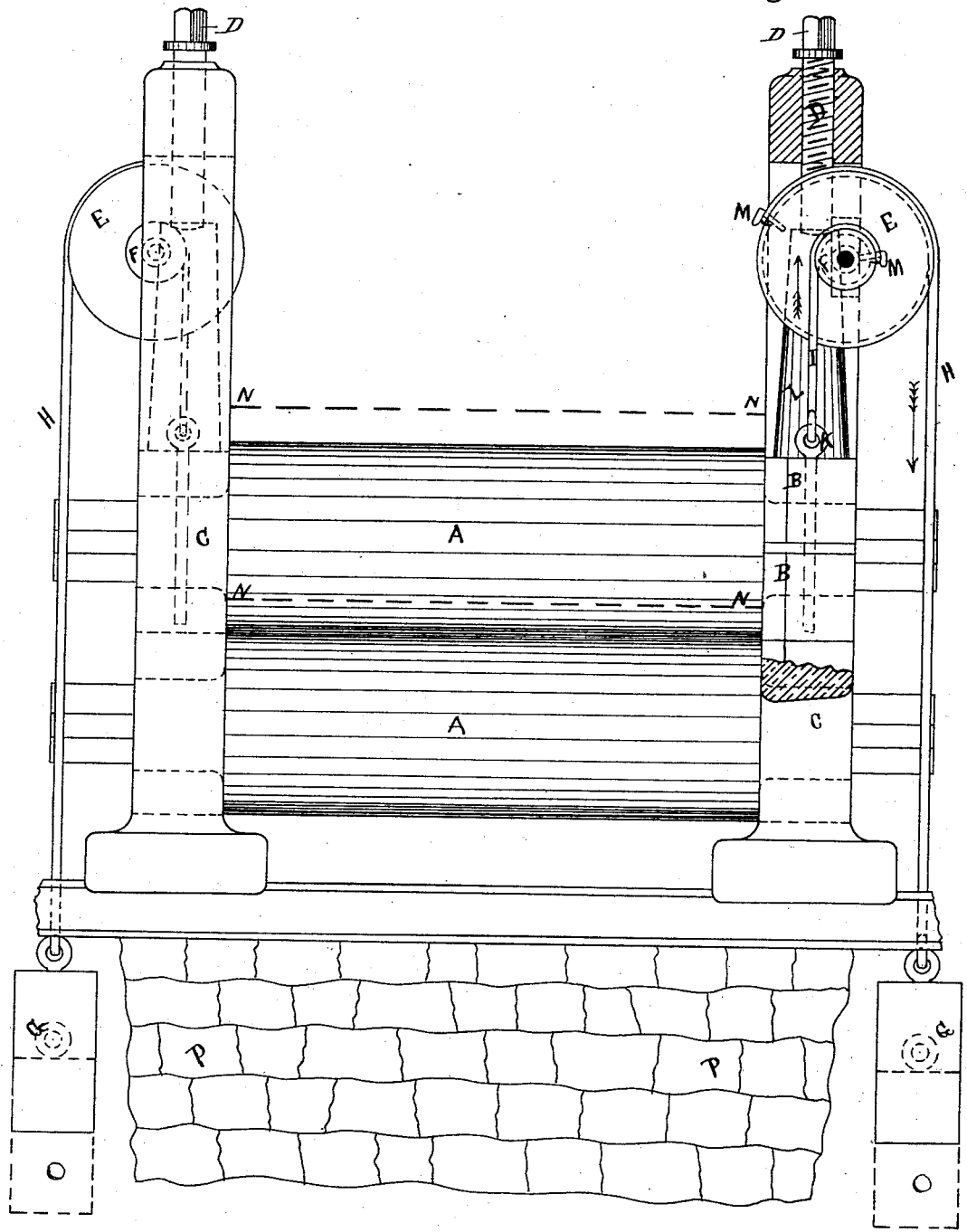
WITNESSES:
INVENTOR
Frank G. Tallman.

UNITED STATES PATENT OFFICE.

FRANK G. TALLMAN, OF BEAVER FALLS, PENNSYLVANIA.

DEVICE FOR BALANCING ROLLS OF ROLLING-MILLS.

SPECIFICATION forming part of Letters Patent No. 367,464, dated August 2, 1887.

Application filed November 18, 1886. Serial No. 219,224. (No model.)

*To all whom it may concern:*

Be it known that I, FRANK G. TALLMAN, of the borough of Beaver Falls, county of Beaver, State of Pennsylvania, have invented certain new and useful improvements in balancing journals for rolling-mills and other machinery where journals or parts of machinery are used and need to be balanced, of which the following is a specification.

My invention relates to a device for balancing or partly balancing a journal or roll bearing in such a manner that it may be raised or lowered any distance with very little effort. Heretofore in rolling-mills the roll-bearings have been balanced by springs, or a combination of levers and weights, or compound levers, all of which methods have proved very inconvenient, troublesome, expensive and unreliable.

The object of my invention is to do away with the above disadvantages of the old style of balancing when rolls or other pieces of machinery were needed to be balanced or partly balanced.

The accompanying drawing is an assembled view of an ordinary set of rolls and housings, showing one application of the balancing device; A being the roll to be balanced or partly balanced; B, the upper half of bearing-journal; B', the lower half.

C C are the housings or supporting framework, one being partly cut away to show the bearing and construction of the device.

D D are the screws for lowering and adjusting the rolls.

E is the large pulley; F, the smaller one; G, the weight; H, the rope or chain to hold weights; I, the rope or chain to hold bearing.

K is the eyebolt, by means of which the rope is attached to lower half of bearing.

L is an ordinary breaking-piece to fill up space between end of screw and top of bearing.

M M are the hooks or bolts to secure ropes or chains to the sheave-pulleys.

N N show position of roll when raised any required distance.

O O show position of weights in pit when roll is so raised.

P P is the foundation, partly cut away to show position of weights.

The general construction of the device consists in having a single or pair of sheave-pulleys or disks of equal or unequal diameter supported upon proper shafts or bearings, with ropes or chains fastened around said pulleys. Pulleys must be either cast together or bolted together, so that they will act in unison, or they may each be keyed or otherwise fastened to the shaft. The diameters of these sheave-pulleys may be equal, or they may be of any proportion, such as four to one, ten to one, &c. One chain or rope is fastened to the sheave-pulley on the opposite side from the bearing to be raised. The other chain or rope is fastened to the pulley on the same side as the bearing, the other end of this rope or chain being attached to the weight, the said weight or rope being hung from the pulley, so that the tension produced by the weight will tend to revolve the pulleys in such a direction that the weight in descending will raise the bearing.

In the case of unequal diameters of sheave-pulleys the rope or chain that is attached to the bearing is attached to the smaller pulley.

The action consists of the following movement: As the screw is moved down to lower the roll-bearing the weight is raised and the slack motion is all taken up by the weight being a little heavier than the bearing. When the screw is run up, the weight in descending raises the roll or bearing and keeps it tight against the screw. If the two sheave-pulleys are four to one, the weight then only need be one-fourth the weight of the roll-bearing and accompanying connections, &c., but would be obliged to travel four times as great a distance as the roll is to be raised. If four weights are used of the proportion of four to one, then each weight would only need to be one-sixteenth the weight of the roll-bearing and connections.

My invention is particularly applicable to bearings for rolls in rolling-mills, sheet-mills, bar-mills, copper, brass, and lead mills, woolen and paper mills, &c., and wherever it is necessary to balance or partly balance a journal. If the movement of the roll is not very great, a lever can be employed in place of pulleys. The drawing clearly shows the convenience with which this device can be attached to any roll-train now running, the facility with which it can be taken off and put on, the general convenience of having the weights hanging in the train-pit out of the way of the connections, from the fact that all the bearings are inside of the housings. It is not necessary that the bearings, or axles of the sheave-pulleys be attached to the roll housing or supports for the main bearings, as they can be put at any convenient distance away and the ropes, chains, or links conducted to them.

I claim—

1. The above-described balancing device for roll-bearings, which consists of a pulley mounted in the housing and attached to the roll-bearing by a rope fastened to the side of said pulley away from the bearing, and of a second pulley rigidly connected to said first pulley and turned by a weight attached thereto by a rope passing over said pulley and attached thereto on the side toward the said bearing, as herein described, and for the purposes specified.

2. A balancing device for journal-bearings in which the bearing is supported by a rope attached to the farther side of the pulley, and in which the weight is attached to a rope fastened to the nearer side of a second pulley keyed to said first pulley, the whole being raised, lowered, and adjusted by a screw, as herein described and shown.

FRANK G. TALLMAN.

Witnesses:
GEO. H. WIGHTMAN,
O. B. BRADFORD.